Patented Apr. 14, 1931

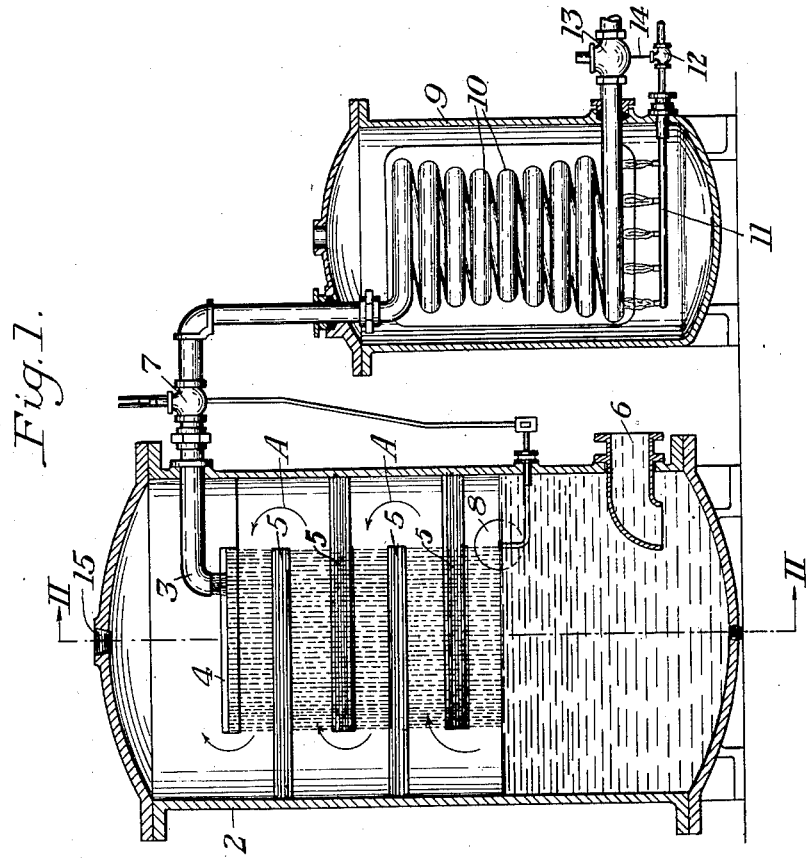
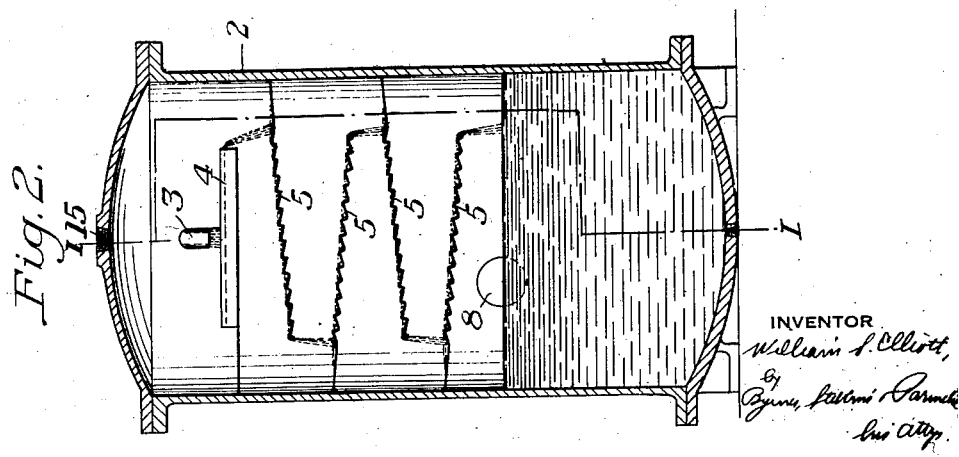

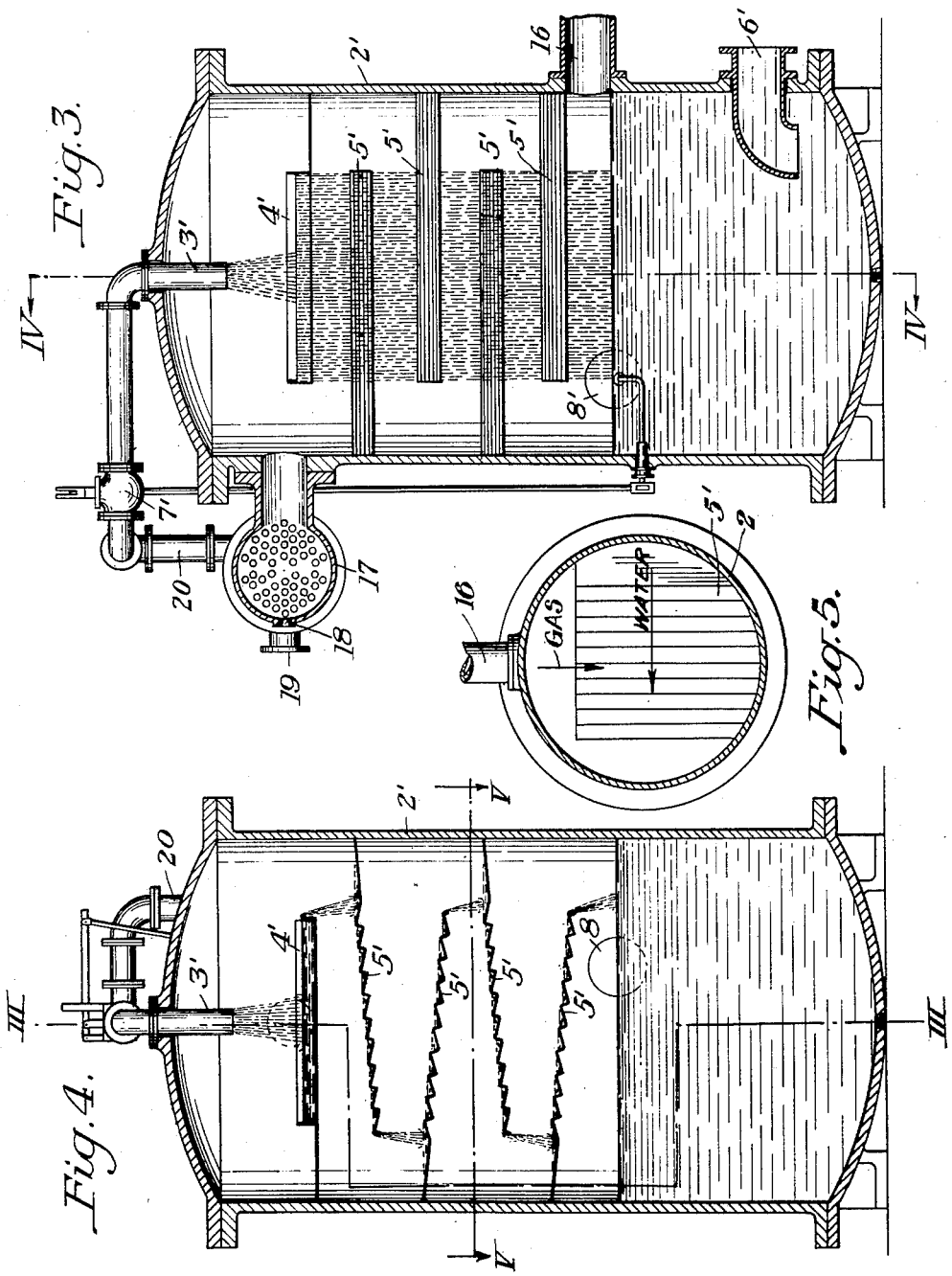

1,800,724

UNITED STATES PATENT OFFICE

WILLIAM S. ELLIOTT, OF PITTSBURGH, PENNSYLVANIA

APPARATUS FOR DEAERATING LIQUID

Application filed June 1, 1925. Serial No. 33,991.

The present invention relates broadly to heat exchanging apparatus, and more particularly to such apparatus as applicable to the deaeration of water. It is well recognized at the present time that to a very large extent oxygen in water as used in power plant equipment is responsible for corrosion. Efforts have accordingly been made to effect the removal of such oxygen in order to overcome the corrosive action of the water, and the present invention relates to an improved apparatus for accomplishing this same result.

It is recognized by those skilled in the art, that the effective deaeration of a liquid such as water depends fundamentally upon the creation of the required partial pressures in the zone in which the liquid is undergoing treatment. Where it is desired to effect the separation of the oxygen dissolved in the water, the partial pressure of the oxygen in the container in which the liquid is being treated should be reduced in order that this result may be accomplished. The result desired is attainable in different ways, among which may be mentioned the addition of heat to the liquid for the purpose of producing evaporation thereof to the desired extent, the reduction of pressure for the purpose of producing evaporation of the liquid, or the creation of a vapor condition in contact with the liquid, which vapor condition has the desired relatively low partial pressure due to the presence of oxygen. Such a vapor condition may be established by the introduction of steam, which theoretically represents the minimum of air content attainable.

As a general proposition, it may be stated that water in contact with an atmosphere vaporizes to an extent depending largely upon the temperature of the water and the temperature of the atmosphere, as well as the dynamic conditions of both. In a still atmosphere, whether the water is in a calm or a turbulent condition, the amount of vaporization is dependent upon the temperature. At a given temperature, the amount of water evaporated is a function of the amount of agitation or turbulency of the water and the velocity of the atmosphere. This velocity determines the ability of the atmosphere to sweep away the vapors and gases rising from the water as they are formed whereby a condition of saturation preventing further evaporation cannot be attained. It will, therefore, be apparent that in order that the maximum amount of vaporization may occur at a given temperature, it is necessary to produce a maximum turbulency of the water and to cause the atmosphere to sweep over the surface of the water at a velocity as high as possible.

In accordance with the present invention, advantage is taken of the creation and maintenance of the desired vapor or partial pressure conditions in the zone in which the liquid is undergoing treatment, and also of the advantages of increased vaporization produced by contact between a travelling body of gas at a high velocity and a body of water in turbulent condition.

In the accompanying drawings there is shown, for purposes of illustration only, certain preferred embodiments of the present invention, it being understood that the drawings do not define the limits of my invention as changes in the construction and operation disclosed therein may be made without departing either from the spirit of the invention, or the scope of my broader claims.

In the drawings—

Figure 1 is a vertical sectional view, partly in elevation, of one form of apparatus embodying the present invention on the line I—I of Fig. 2.

Figure 2 is a vertical sectional view on the line II—II of Figure 1 looking in the direction of the arrows.

Figure 3 is a view similar to Figure 1, on the line III—III of Fig. 4, illustrating, however, a slightly modified embodiment of the present invention;

Figure 4 is a vertical sectional view on the line IV—IV of Figure 3 looking in the direction of the arrows; and Figure 5 is a transverse sectional view, on a reduced scale, on the line V—V of Figure 4, looking in the direction of the arrows.

It has heretofore been proposed in the art to which the present invention relates, to provide apparatus for separating gases from liquid, comprising a heater in which the water and vapors pass among a series of pans and sprays in a counter flow direction. The result of heaters of this character as heretofore designed, however, has been an actual penetration by the air and gas released in one stage with the water in another stage. Thus re-absorption of the released air and gases has been inevitable by reason of the fact that the gases have been caused to pass through the streams of water dropping from pan to pan. With such apparatus there has been obtained deaeration in the last stages, but this has been entirely counteracted or substantially counteracted by the aerating action in the earlier stages.

In carrying out the present invention advantage is taken of the principle of counter flow of water with air and gases, but the construction is such that the released gases, while caused to pass over the liquid which is preferably maintained in an agitated or turbulent state so as to sweep away vapors and gases arising from the liquid, have not been permitted to pass through the body of liquid falling from one agitating device to another. The present invention further contemplates the treatment of water in a plurality of different stages, the vapors released in some of the later stages being utilized as a heating medium in some of the earlier stages, with a consequent condensation of the vapors so that there is no substantial heat loss during the operation of the apparatus.

In the embodiment of the invention illustrated in Figures 1 and 2, there is provided a container 2 having an upper vapor space and a lower liquid receiving and storing space. Extending into the vapor space is a liquid inlet 3 delivering to a distributing device 4 which in turn overflows onto a series of agitating devices herein illustrated as comprising oppositely disposed pans or trays 5. As illustrated, these pans are preferably so constructed as to provide a rough path of travel for the water whereby the water during its passage thereover is maintained in an agitated or turbulent condition and at the same time exposed over a comparatively large surface. This water passes successively over the trays in a downward direction, finally being received by the liquid storage space at the bottom of the container from which it may be withdrawn as required for use through an outlet connection 6. The flow of water into the container may be automatically controlled in accordance with demand for deaerated water by providing the inlet 3 with a regulating valve 7 adapted to be operated in any desired manner, as for example, by means of a float 8 operated upon variations in the level of liquid in the storage space of the container. With such a construction, as the liquid level lowers, the valve 7 will be opened to a greater extent to permit the entry of more water, while as the liquid level rises in the storage space the reverse action with respect to the valve 7 will take place. In this manner the apparatus is automatically operated in accordance with the demands of the user, a supply of deaerated liqued always being available.

For the purpose of supplying heat to the water, there may be provided a heater 9 of the instantaneous type, embodying coils 10 through which the water flows in such manner as to be heated to the desired temperature by the flame produced by a burner 11. Ordinarily, these burners are of the gas type having a valve 12 adapted to be connected to the water system in such manner that an increase of flow through the apparatus will produce a correspondingly greater increase in the flow of gas. This may be accomplished by utilizing a pressure operated water valve 13 having a connection 14 with the gas valve in such manner that the gas valve is automatically controlled as desired. By initially setting the valves as determined in order to produce the required temperature conditions, it will be apparent that thereafter definite conditions will be maintained with respect to temperature, as the amount of heat supplied will be proportional to the amount of water.

In actual operation, when water is withdrawn through the connection 6, water will be supplied to the inlet 3, this water having been previously heated to the exact temperature determined by the setting of the valves. The heated liquid will flow downwardly over the pans or agitating devices 5 in a turbulent condition. During this travel of the water there will be effected the release of vapor, air and gases. The amount of evaporation obtained will be greater than is obtained with ordinary heaters for the reason, as before pointed out, that the water is maintained in a turbulent condition. With the construction illustrated, the air, gases and vapors released in the lower stages will pass serially upwardly through the upper stages. During this passage they will sweep over the liquid on the agitating devices at a comparatively high velocity in such manner as to sweep away any gases and vapors that may arise from the water during its passage thereover. The path of travel of the gases and vapors as indicated by the arrows A is, however, different from the path of travel of the water, so as to make it unnecessary for the previously released gases to again pass through a body of water in such manner that they may become reabsorbed. This may be accomplished by causing the air and gases to pass transversely of the agitating devices, as clearly shown in the drawings, the flow being successively from a lower device to a higher device. In this manner the ideal factors of turbulency of the water, a high velocity of the gases and vapors, and a high temperature of the water are all obtained. These factors all cooperate to produce within the vapor space of the container partial pressure conditions ideal for the release of contained air from the water. This released air, together with any vapor which may not have become condensed during passage over the upper devices, escapes from the container through a vent 15.

In Figures 3 and 4 of the drawings there is illustrated a slightly modified form of the apparatus, parts corresponding to parts already described being, however, designated by the same reference characters having a prime affixed thereto. In accordance with this embodiment of the invention, heat is supplied to the container by means of a steam inlet 16. The vent 15' in turn cooperates with a condenser 17 having an air offtake 18. The water to be treated flows first through the condenser by means of an inlet 19 and thence through an outlet 20 and valve 7' to the inlet 3'. With such a construction, the water entering the apparatus has been preheated to an extent determined by the heat of the vapors and gases passing through the condenser. This partially heated water enters the apparatus and flows downwardly therethrough over the agitating devices 5' in the manner before described. The steam admitted through the inlet 16 flows upwardly through the apparatus in the opposite direction, there being, however, a path of flow similar to that before described, whereby air and gases released from the water and swept upwardly therefrom with the vapor are not permitted to become re-absorbed. The lowest temperature of the water is obviously its entering temperature, while the highest temperature is that which exists adjacent the lowest pan. Consequently, the amount of vapor or steam passing through the pans will gradually decrease as it reaches the top of the vapor space owing to the amount absorbed by the colder water as the steam comes into contact with it. Any surplus steam will pass into the condenser 17 along with the air and other gases.

In the case of extremely efficient heaters, it is possible to assume a condition in a structure of the character illustrated in Figures 3 and 4, in which the liquid in the liquid storage space of the container reaches a temperature approximately equal to that of the entering steam. In such a case, the supplied steam would itself determine the partial pressure existing above the liquid, and in view of the relatively low partial pressure of the air, separation of oxygen dissolved in the water would be insured. Even with such a condition of temperature in the lower portion of the apparatus, however, evaporation would take place as the liquid flows over some of the upper trays, and this evaporation will be effective for maintaining the desired conditions for deaeration. At the same time, the velocity of the vapors and gases passing over the liquid insures the prompt sweeping away of the released air without any possibility of any reabsorption thereof. It will be understood that with a heater of this type the amount of steam supplied is proportional with the amount of work being done by the heater, so that substantially constant temperature conditions in the heater can be automatically maintained irrespective of variations in the flow of water therethrough.

It will be observed that in both types of apparatus there is a continuous and progressive treatment of successively admitted water under such conditions that water in a later stage of deaeration is not mixed with water in a materially earlier stage of deaeration, while water in an earlier stage of deaeration is subjected to the action of vapors and gases from a later stage without possibility of re-absorption of the released air, or the possibility of contact between vapors and gases between an earlier stage with water at a later stage. As the water is continuously and progressively treated in the manner referred to, it is brought into contact with conditions of temperature and pressure such as to produce the desired results, such conditions being continuously maintained, at least with respect to a predetermined minimum. The invention contemplates the continuous bringing into action of an amount of heat necessary, at least with respect to the minimum referred to, to produce a change of phase of the liquid to an extent to effect the release of all of the air therefrom. This change of phase, as pointed out, takes place under ideal conditions by reason of the continuous control of pressures, both total and partial, and of temperature by reason of the inter-relation between the amount of water supplied and the amount of heat.

It is desirable from the standpoint of most efficient results to have the water leave the last agitating devices at a temperature at least substantially corresponding to the boiling point of the water or the pressure obtaining in the liquid storage space, and the invention contemplates temperature conditions such that this operation may be obtained.

The advantages of the present invention arise from the provision of a method and apparatus for effecting deaeration of water under such conditions that re-absorption of the released air and other gases is effectively prevented.

Further advantages of the invention arise from the provision of an apparatus capable of maintaining the water in a turbulent or agitated condition and in contact with gases and vapors flowing thereover at a comparatively high velocity, whereby the amount of evaporation is maintained at a maximum.

I claim:

1. Deaerating apparatus, comprising a container having a liquid space and a vapor space, a plurality of agitating trays in the vapor space with adjacent trays offset relative to each other on each of two sides, means for supplying the liquid to be treated to the upper tray whereby it is caused to pass downwardly over one of the offset sides of each of the trays in series, and a separate flow path for the released air and gases extending over each of the other of the offset sides of the agitating trays but not intersecting the flow path of the water thereover, said agitating trays having an irregular flow path contour to maintain the water in a turbulent film-like condition during its passage thereover, substantially as described.

2. In a deaerating appartus, a container, and trays therein each having two free sides only with the remainder of the tray perimeter closed, said trays being downwardly inclined to cause the passage of water downwardly over one of the sides of each tray and the passage of the vapors and gases upwardly around the other side of each of said trays, substantially as described.

3. In a deaerating apparatus, a container, and trays therein each having two free sides only with the remainder of the tray perimeter closed, said trays being downwardly inclined to cause the passage of water downwardly over one of the free sides of each tray and the passage of the vapors and gases upwardly around the other free side of each of said trays, the sides of said trays being offset and so arranged as to provide a flow of water which is substantially normal to the flow of vapors and gases, substantially as described.

4. In a deaerating apparatus, a container, a source of water supply therefor, means in said container compelling a vapor and gas flow transversely of the container in one direction and a water flow transversely thereof in another direction substantially normal thereto, substantially as described.

5. In a deaerating apparatus, a container, a source of water supply therefor, means in said container compelling vapor and gas flow transversely of the container in one direction and a water flow transversely thereof in another direction substantially normal thereto, said means comprising superimposed trays each having two free sides, substantially as described.

6. In a deaerating apparatus, a container and trays therein each having two free sides and the remainder of the tray perimeter closed, said trays each being downwardly inclined and arranged with the closed and open sides of successive trays alternating to cause the passage of water downwardly over one of the free sides of each tray and the passage of the vapor and gases upwardly around the other sides of said trays.

7. In a water treating apparatus, superimposed trays each having two free sides and the remainder of the tray perimeter closed, alternate trays having corresponding sides free and corresponding sides closed with the intermediate trays offset relatively thereto.

8. In a water treating apparatus, superimposed trays each having two free sides and the rest of the side edge closed, alternate trays having corresponding sides free and corresponding sides closed with the intermediate trays offset relatively thereto, said trays being constructed to continuously agitate the water during its passage thereover.

9. Deaerating apparatus comprising a container having a liquid space and a vapor space, a plurality of agitating trays in the vapor space arranged in staggered relation, means for supplying the liquid to be treated to the upper tray whereby it is caused to pass downwardly over the trays in series, the opposite sides of adjacent trays being closed to provide a separate flow path for the released air and gases extending over the agitating devices but not intersecting the flow path thereover, substantially as described.

10. Deaerating apparatus comprising a container having a liquid space and a vapor space, a plurality of agitating trays in the vapor space arranged in staggered relation, means for supplying the liquid to be treated to the upper tray whereby it is caused to pass downwardly over the trays in series, the opposite sides of adjacent trays being closed to provide a separate flow path for the released air and gases extending over the agitating devices but not intersecting the flow path thereover, said agitating devices being constructed to maintain the water in turbulent condition in passage thereover.

In testimony whereof I have hereunto set my hand.

WILLIAM S. ELLIOTT.